US011254378B2

(12) United States Patent
Behrens et al.

(10) Patent No.: US 11,254,378 B2
(45) Date of Patent: Feb. 22, 2022

(54) RUNNING GEAR CHAIN, IN PARTICULAR BOGIE CHAIN

(71) Applicant: ContiTech Transportbandsysteme GmbH, Hannover (DE)

(72) Inventors: Carsten Behrens, Bilshausen (DE); Olaf Kluth, Hannover (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 208 days.

(21) Appl. No.: 16/490,119

(22) PCT Filed: Jan. 18, 2018

(86) PCT No.: PCT/EP2018/051141
§ 371 (c)(1),
(2) Date: Aug. 30, 2019

(87) PCT Pub. No.: WO2018/157993
PCT Pub. Date: Sep. 7, 2018

(65) Prior Publication Data
US 2019/0389523 A1    Dec. 26, 2019

(30) Foreign Application Priority Data

Mar. 2, 2017   (DE) .......................... 102017203363.0

(51) Int. Cl.
*B62D 55/24* (2006.01)
*B62D 55/253* (2006.01)
(Continued)

(52) U.S. Cl.
CPC ......... *B62D 55/242* (2013.01); *B62D 55/253* (2013.01); *B62B 2301/256* (2013.01);
(Continued)

(58) Field of Classification Search
CPC .. B62D 55/242; B62D 55/253; B62D 55/244; B62D 55/28; B62D 55/30; B62D 55/27; B62B 2301/256
See application file for complete search history.

(56) References Cited

U.S. PATENT DOCUMENTS 2,312,072 A * 2/1943 Tenger ................... B62D 55/20
305/161
3,883,190 A * 5/1975 Kilbane, Jr. ........... B62D 55/24
305/180
(Continued)

FOREIGN PATENT DOCUMENTS

| AT | 120470 T | 4/1995 |
| CA | 1110297 A | 10/1981 |

(Continued)

OTHER PUBLICATIONS

International Search Report dated May 15, 2018 of International Application PCT/EP2018/051141 on which this application is based.

*Primary Examiner* — Kip T Kotter
(74) *Attorney, Agent, or Firm* — Gregory Adams; David L. Cate (57) ABSTRACT

The present invention relates to a running gear chain (2), in particular a bogie chain (2), having a flexible body (20), preferably an elastomer body (20), which is closed in endless fashion, or closable in endless fashion, in a running direction (A). The running gear chain (2) according to the invention is characterized by a multiplicity of rigid transverse elements (24) which are connected to the outer side of the flexible body (20) and extend substantially transversely with respect to the running direction (A), wherein at least some of the rigid transverse elements (24), preferably all of the rigid transverse elements (24), are arranged so close together in the running direction (A) that, with a planar extent of the flexible body (20), two immediately adjacent (Continued)

rigid transverse elements (24) make contact in the running direction (A).

16 Claims, 4 Drawing Sheets

(51) Int. Cl.
 *B62D 55/28* (2006.01)
 *B62D 55/30* (2006.01)
(52) U.S. Cl.
 CPC ............ *B62D 55/244* (2013.01); *B62D 55/28* (2013.01); *B62D 55/30* (2013.01)

(56) References Cited

U.S. PATENT DOCUMENTS

| | | | |
|---|---|---|---|
| 2,345,763 A | 4/1994 | Mayne | |
| 5,630,657 A | 5/1997 | Kumano et al. | |
| 2008/0136254 A1* | 6/2008 | Jacobsen | B62D 55/27 305/165 |
| 2008/0211301 A1* | 9/2008 | Jee | B62D 55/244 305/177 |
| 2008/0284244 A1* | 11/2008 | Hirose | B62D 55/242 305/165 |
| 2010/0206648 A1 | 8/2010 | Kelppe et al. | |
| 2011/0037313 A1 | 2/2011 | Delisle et al. | |
| 2014/0001829 A1* | 1/2014 | Uchiyama | B62D 55/244 305/167 |
| 2015/0097419 A1 | 4/2015 | Mizusawa | |
| 2015/0336624 A1* | 11/2015 | Sun | B62D 55/20 305/138 |
| 2018/0162467 A1* | 6/2018 | Correa | B63H 19/08 |

FOREIGN PATENT DOCUMENTS

| | | | | |
|---|---|---|---|---|
| CN | 101264773 A | | 9/2008 | |
| DE | 7011002 U | | 7/1970 | |
| DE | 2600243 A1 | * | 7/1977 | ............ B62D 55/28 |
| DE | 2933633 A1 | | 3/1980 | |
| EP | 0251255 A2 | | 1/1988 | |
| EP | 2195228 A1 | | 6/2010 | |
| EP | 2275325 A2 | | 1/2011 | |
| EP | 2857295 A1 | | 4/2015 | |
| FR | 1181920 A | | 6/1959 | |
| GB | 190416345 A | | 6/1905 | |
| GB | 1027227 A | * | 4/1966 | ........... B62D 55/096 |
| JP | 2007186042 A | * | 7/2007 | |
| WO | 2012142705 A1 | | 10/2012 | |
| WO | 2016012592 A1 | | 1/2016 | |

\* cited by examiner

RUNNING GEAR CHAIN, IN PARTICULAR BOGIE CHAIN

The present invention relates to a running gear chain, in particular a bogie chain.

Use is made in various fields of land vehicles which do not move directly on wheels on the ground but do this via chains, belts and the like. In other words, the wheels, rings, rollers and the like of the land vehicle are driven to rotate and roll from inside on a chain etc. or drive said chain, which bears for its part on the ground by its outer side. In this way, the land vehicle can perform a translational movement on the ground. Such drives are found, for example, in agriculture, in forestry, in mining and in the building sector and also in military applications.

In this context, particular belts are known in forestry which are referred to as bogie belts or as bogie chains. These bogie belts or bogie chains are arranged around the customarily two to three wheels of a land vehicle. The wheels are customarily pneumatic rubber tires. Such a bogie belt with a corresponding land vehicle for forestry is known from EP 2 195 228 B1, for example.

A "conventional" bogie chain customarily consists of two traction chains which are closed in endless fashion in the circumferential direction, in the running direction or in the longitudinal direction. The two traction chains are connected fixedly to one another by means of profiled connecting elements oriented transversely with respect to the running direction, wherein the profiled connecting elements are spaced apart from one another in the running direction. Here, the profiled connecting elements project in width or in the transverse direction beyond the width of the wheels and engage around them in a laterally inwardly directed manner, with the result that the bogie chain can be held laterally on the tires. The profiled connecting elements are customarily of solid and transversely stiff design in order to impart sufficient stiffness to the bogie chain in its width and to hold the bogie chain laterally on the tires during operation. In this way, the endless bogie chain envelops the wheels during operation both laterally to some extent and completely in the running direction, with the result that, during propulsion, the wheels can roll within the chain partly on the ground and partly on the profiled connecting elements.

Here, the transverse elements increase the mechanical interlocking with the ground such that a greater propulsion torque can be achieved (increase in traction) on wet and/or soft ground by comparison with a conventional tire pairing. Lateral guide elements and/or central guide elements, for example in the case of a multiple set of tires, which customarily consist of a metal body, of an elastomer material or of combinations thereof, hold the chain in the track during operation.

Such drives are used in forestry, for example in wood harvesting machines, which may be referred to, for example, as forwarders, logging machines and the like.

A disadvantage with such bogie chains is that, although the bogie chain in the region between the wheels can lie on the ground, it has too little intrinsic stiffness for forces to be able to be transmitted to the ground via these interspaces. Consequently, the effective contact area is increased only slightly by the use of such a bogie chain.

A further development of the above-described conventional bogie chain can be seen as the use of a so-called rigid-back bogie chain which has, as profiled connecting elements, rigid-back whole-area steel segment chains, such as, for example, steel hollow profiles, which are connected to one another by means of joints. The pivot point of the chain joints here lies above the profiled segments in the inner side of the chain, that is to say facing the tread of the wheels.

It is advantageous here that, by virtue of the arrangement of the joints, which have only one bending direction, the interspaces of the bogie chain between the wheels can be utilized rather as an effective contact area than in the case of the conventional bogie chain. By comparison with an above-described bogie chain, the greater contact area achieved by a rigid-back bogie chain produces a greater effective contact area and thus has the effect of lower soil compaction in combination at the same time with further improvement of the possible traction on soft and viscous grounds. It is also possible in this way to produce a greater propulsion with the same drive power. As an additional positive side effect there should also be mentioned the thus resulting higher bearing power for each axle on account of the greater contact area for each axle, which can apply particularly for unfavorable soil conditions. Also associated with this is a higher degree of utilization under extremely damp weather conditions in which wheeled running gear and also bogie running gear with the above-described bogie chain could not previously be used.

Here, both the above-described conventional bogie chains and the rigid-back bogie chains are either permanently fixedly connected to the bogie tire running gear as already endlessly closed chains, which can mean a considerable separating effort for the connecting hinge, for example to replace the bogie chain, or else the conventional bogie chains are to be endlessly closed in situ on the vehicle with the aid of a customarily correspondingly heavy tool with joint connectors. The rigid-back bogie chains are to be correspondingly endlessly closed via one of their joints.

The rough use conditions of such bogie chains require an extremely solid construction. For this reason, all the components of such bogie chains are customarily manufactured from high-strength materials, such as mostly steel.

A disadvantage both of the conventional bogie chain and of the rigid-back bogie chain consists in the fact that the large number of chain joints constitutes a high wear risk. Given a customary multi-year use, the topic of corrosion should also be considered and a thus-induced "seizing" of a chain joint is to be understood as a considerable weakness of such bogie chains since each seized joint increases the rotational resistance of the individual chain elements per se and thus leads to an increase in the fuel consumption. If this is intended to be avoided, an increased regular maintenance and lubricating expenditure has to be expected that lead, however, to an impact on the environment and is therefore to be avoided as far as possible for reasons of environmental protection.

A further disadvantage is that the gradual deflection of the chain joints can result in a widening of the chain joints owing to a joint play caused thereby, which can lead to a lengthening of the bogie chain in the running direction. This wear-induced additional play in the joint means that the distance between two profiled connecting elements oriented transversely with respect to the running direction is gradually increased and the flexing in the running direction increases considerably. The corresponding contact area of the bogie chain between the wheels is thus reduced and, in addition to the resulting wear, the generated soil compression of the running gear is also increased by comparison with a new bogie chain.

A further disadvantage is that, under the damp conditions to which bogie chains are customarily exposed during operation, the friction pairing of bogie chain, consisting for example of steel, and wheels, customarily consisting of rubber, is to be considered as rather unfavorable because it can readily lead to slip of the drive wheel within the bogie chain. This particularly applies in the case of corresponding contamination.

DE 29 33 633 A1 describes a crawler for off-road vehicles and machines, preferably for forestry and agriculture, which is intended to be driven via wheels. The crawler has at least two tension elements of steel material which run at a distance from one another and in parallel and which extend in the longitudinal direction. The crawler further has crawler plates which connect these tension elements and which each have a steel frame. At its outwardly directed side of the steel frame, each crawler plate has a pad of elastomer material which covers the steel frame. The tension elements between the crawler plates that are connected to the crawler plates consist of joint elements which are articulatedly connected to one another. The joints are each arranged on the side of the crawler plates that faces away from the pad and are articulatedly connected to one another by means of a pin connection.

EP 2 275 325 A2 describes an endlessly closed chain for an off-road vehicle, such as, for example, for a vehicle for forestry. The vehicle has a drive which can transmit its power via a drive train via two drive wheels to the chain. The drive wheels run on the inner side of the chain. The chain lies by the outer side on a ground. The chain consists of a multiplicity of chain sections which are articulatedly connected to one another by means of a respective joint. The chain sections each have an elastomer basic body, the connecting elements of the joints being arranged on the ends of said basic body in the running direction. A multiplicity of reinforcing elements are embedded into each of the basic bodies. The reinforcing elements include a multiplicity of reinforcing cables which extend adjacently to one another in the running direction in order to increase the tensile force of the endlessly closed chain. Further reinforcing elements in the form of woven fabric layers are also present. The outer side of the chain, which faces the ground, has a multiplicity of profiled elements which serve to increase the adhesion and are formed in one piece with the elastomer basic body.

A disadvantage with the crawler of DE 29 33 633 A1 and of the chain of EP 2 275 325 A2 is that the tension elements or chain sections are each connected to one another with metallic joints which can have the above-described disadvantages of wear, corrosion and seizing. In particular, the deflection of the joints can in each case lead to a widening of the crawler or of the chain that can lead to a considerable flexing of the crawler or of the chain between the wheels of the drive of the vehicle. This means a considerably reduced bearing load of the crawler or of the chain between the wheels.

WO 2012 142 705 A1 describes an endlessly closed chain for use in a track-laying vehicle, such as, for example, a vehicle for forestry. The chain consists of individual chain segments which are endlessly closed in the longitudinal direction or in the running direction. Each chain segment has a reinforced elastomer material. A connecting element is arranged at each end of each chain segment in the longitudinal direction or in the running direction such that the chain segment can be jointlessly connected in the longitudinal direction or in the running direction in order to close the chain segments to form an endlessly closed chain. To reinforce the chain segments, reinforcing elements, such as, for example, cables, which extend in the longitudinal direction, are provided which extend between the respective connecting elements and are connected thereto. On the outer side, which faces the ground, the chain segments have an elastomer profiling which is formed in one piece with the respective elastomer chain segment. On the inner side, which faces away from the ground, the chain segments each have, centrally in the transverse direction, inwardly projecting elastomer teeth which are formed in one piece with the respective elastomer chain segment and serves for the engagement of a drive wheel of the running gear of the vehicle.

Another disadvantage with the elastomer chain of WO 2012 142 705 A1 is that a considerable flexing of the chains can occur between the wheels of the drive of the vehicle. Admittedly, the reinforcement within the elastomer material of the chain to transmit tensile forces in the longitudinal direction or in the running direction can ensure a certain degree of stability. It is also possible through the avoidance of joints to avoid the disadvantages thereof described above. However, a flexing of the chains between the wheels of the drive of the vehicle cannot at all be avoided in this way, with the result that this disadvantage of the crawler of DE 29 33 633 A1 and of the chain of EP 2 275 325 A2 remains even when using a reinforced elastomer chain.

An object of the present invention is to provide a running gear chain, in particular a bogie chain, of the type described at the outset such that a flexing of the running gear chain can be better avoided than known hitherto. In particular, it is sought to increase the effective contact area between the wheels, rollers etc. of the running gear. It is at least intended to provide one alternative to known running gear chains.

The object is achieved according to the invention by a running gear chain.

The present invention thus relates to a running gear chain, in particular a bogie chain, having a flexible body, which is preferably an elastomer body. The flexible body is either already closed in endless fashion in a running direction or the flexible body is closable in endless fashion, for example by means of a lock. The running gear chain can be used in various vehicles for agriculture, for forestry, for the construction industry, for mining and for military applications and elsewhere where fully tracked or half-tracked vehicles or other track-laying vehicles can be used. This includes all off-road vehicles. Also included in forestry are the vehicles which are used with bogie chains or bogie belts.

The running gear chain according to the invention is characterized by a multiplicity of rigid transverse elements which are connected to the outer side of the flexible body and extend substantially transversely with respect to the running direction, wherein at least some of the rigid transverse elements are arranged so close together in the running direction that, with a planar extent of the flexible body, two immediately adjacent rigid transverse elements make contact in the running direction. In other words, the rigid transverse elements produce not only a stiffening of the running gear chain in the transverse direction but are designed and arranged in such a way that, when the running gear chain extends in a planar manner, they can lead through their contact with one another to a rigid and firm contact area in the running direction. The rigid transverse elements are thus arranged so close together that, if the flexible body were to tend to flex inwardly between the wheels or the like, the rigid transverse elements would butt against one another in the running direction and thus prevent the inward flexing.

It is possible in this way according to the invention, when the running gear chain lies flat on a ground, to achieve at least a smaller inward flexing than customary hitherto in this region between the wheels or the like or even to completely avoid an inward flexing. As a result, the effective contact area between the wheels, rollers etc. of the running gear can be increased.

This effect can be achieved over the circumference of the running gear chain wherever corresponding rigid transverse elements are arranged correspondingly close together. If therefore preferably such rigid transverse elements are provided over the entire circumference of the running gear chain and all of the rigid transverse elements are arranged correspondingly close together, the above-described advantages can also be achieved continuously. Here, the rigid transverse elements can be connected to the flexible body in a form-fitting, force-fitting and/or integrally bonded manner in such a way that they run around the running gear of a vehicle and can form the above-described contact area in the running direction.

Providing the flexible body here as an elastomer body can be advantageous to achieve a better adhesion between the running gear of a corresponding vehicle and the running gear chain. This particularly applies to bogie chains which have rubber tires as wheels or as running gear. In this case, a particularly good adhesion can be achieved between the elastomer inner side of the running gear chain and the rubber tires of the running gear. This adhesion can in particular be considerably better than in the case of hitherto known bogie chains which are customarily of metal design and, precisely in the case of moisture and contamination, can have a considerably lower adhesion in relation to rubber tires than an elastomer inner side of a running gear chain.

If an elastomer body is used as a flexible body, it is to be formed to have as low an extensibility as possible in order to allow contact between two immediately adjacent rigid transverse elements with a planar extent of the flexible body in the running direction. In other words, the elastomer body is to be formed in such a way that there can be avoided as far as possible extensions in the running direction which could lead to spacings between two immediately adjacent rigid transverse elements and thus prevent their contact. This can be achieved, for example, by an elastomer material having corresponding low extensibility. Alternatively or additionally, tensile members can also be used in the running direction, as will be discussed more fully below.

The lock can have a joint or be formed as a joint via which the flexible body can be closed in endless fashion. Alternatively, the lock as connecting element can also be formed jointlessly, with the result that a completely jointless running gear chain can be created. The lock, whether formed as joint or as connecting element, can preferably be arranged directly below a transverse element, or the lock can be formed as a constituent part of a transverse element. This can lead to an arrangement of the transverse elements that is without intervals.

According to one aspect of the present invention, at least some of the rigid transverse elements, preferably all of the rigid transverse elements, are connected to the outer side of the flexible body so as to be rowed up in the running direction without intervals. In other words, the rigid transverse elements are connected to the outer side of the flexible body so as to be rowed up gap-free, that is to say without interspace, in the running direction. This can ensure such a close arrangement of the rigid transverse elements that contact with one another in a planar extent can be achieved.

According to a further aspect of the present invention, the individual rigid transverse elements are each designed to be short in the running direction such that the running gear chain can be bent around running gear of a vehicle. This can at the same time ensure that a sufficient flexibility of the running gear chain remains in order to achieve a sufficient deflection of the running gear chain according to the invention for example at a wheel or the like, as is required for the operation of a running gear chain. Here, the rigid transverse elements can gape apart in the running direction when the flexible body is deflected and bent, because the rigid transverse elements are connected by their inner surface to the outer side of the flexible body. This can allow the sufficient flexibility of the running gear chain according to the invention without influencing the reduction according to the invention of the inward flexing with planar contact.

According to a further aspect of the present invention, at least some of the rigid transverse elements, preferably all of the rigid transverse elements, are connected to the outer side of the flexible body in an integrally bonded manner, preferably by vulcanization. This can produce a secure and permanent hold. If this integrally bonded connection is achieved by vulcanization in that at least the flexible body contains an elastomer material or consists of an elastomer material, this connection can be concomitantly produced during the vulcanization of the flexible body, and therefore further assembly steps can be dispensed with.

According to a further aspect of the present invention, at least some of the rigid transverse elements, preferably all of the rigid transverse elements, are connected to the outer side of the flexible body in a force-fitting manner, preferably by bolts, rivets or screws. This can ensure a secure hold which, however, can be capable of being released nondestructively. This can be advantageous if, for example, a damaged or worn rigid transverse element is intended to be replaced.

According to a further aspect of the present invention, at least some of the rigid transverse elements, preferably all of the rigid transverse elements, are connected to the outer side of the flexible body in a form-fitting manner, preferably by insertion transversely with respect to the running direction. This can ensure a simple hold which can also allow simple and rapid replaceability of the rigid elements.

According to a further aspect of the present invention, the form-fitting connection can be achieved by a tongue and groove system, preferably by a dovetail toothing, which form the outer side of the flexible body and the inner side of the rigid transverse element with one another. In this way, a rigid transverse element can be inserted in the transverse direction with a tongue profile or dovetail profile into a corresponding groove in the outer side of the flexible body and be held there in a form-fitting manner in the running direction and in a force-fitting manner in the transverse direction. At the same time, the force-fitting hold of the rigid transverse element in the transverse direction can be overcome in a comparatively simple manner by means of force in order to remove said element.

According to a further aspect of the present invention, the flexible body has at least one tension member, preferably a multiplicity of tension members, which extends/extend in the running direction and is/are closed in endless fashion, or closable in endless fashion, with the flexible body in a running direction. In this way, tensile forces can be transmitted in the running direction such that the flexible body can be relieved of this loading. This effect can be multiplied by a multiplicity of tension members or the same effect can be achieved by a plurality of relatively thin tension members which can be arranged so as to be preferably spaced apart from one another in the transverse direction and so as to be preferably uniformly distributed parallel to one another in order likewise to uniformly distribute the force transmission. Providing the tension member here such that it is preferably embedded into an elastomer material of the flexible body can be advantageous in order to achieve an optimum adhesion and thus force transmission between the tensile member and the elastomer body.

According to a further aspect of the present invention, the tension member is a cable, preferably a steel cable, a glass fiber cable or an aramid cable. This makes it possible to ensure a secure and long-lasting transmission of tensile forces. Here, the different materials can have different costs, durabilities and cross sections for transmitting the same tensile forces, with the result that, depending on the application or selection criterion, a suitable tension member can be selected.

According to a further aspect of the present invention, the tension member is a sheetlike structure, preferably a single-layer or multilayer sheetlike woven fabric, particularly preferably a sheetlike textile woven fabric, which preferably consists of steel, of glass fiber, of synthetic fiber, of natural fiber or of aramid fiber or of a combination thereof. It is also possible in this way to achieve a secure transmission of tensile forces which, in the case of a textile woven fabric, however, is suitable rather for lower tensile forces than is possible with cables. However, the sheetlike structure used can also be a thin metal plate which allow a transmission of tensile forces comparable to that with steel cables and on account of its small thickness can be sufficiently flexible in order to be able to run around running gear. A sheetlike structure makes it possible to obtain a more uniform transmission of tensile forces than with cables. Furthermore, the attachment of the tensile member as a woven fabric can occur over a larger area than in the case of cables.

According to a further aspect of the present invention, the tension member is formed over the entire width of the running gear chain, or the tension member is formed only over part of the width of the running gear chain. In the first case, the transmission of forces can be distributed in as uniform a manner as possible over the entire width of the running gear chain. In the second case, regions of the running gear chain in the transverse direction can be left free so that it is possible to arrange there for example fastening means through the flexible body without thereby damaging the tension member. If preferably at least one edge region in the transverse direction, and if particularly preferably both edge regions in the transverse direction, is/are formed free of tension members, it is possible for example for such fastening means to be provided precisely there. It is thus also possible for damage to the tension member caused by damage to the running gear chain which can start from its edges in the transverse direction and in particular from its outer edge in the transverse direction to be kept as far away as possible from the tension members.

According to a further aspect of the present invention, the flexible body has an inner profiling on its inner side at least partially in the transverse direction and/or in the running direction. In this way, the adhesion between the inner side of the running gear chain and the running gear of a corresponding vehicle can be improved. This particularly applies to an elastomer inner side of the running gear chain and rubber tires of the running gear. Here, it can be already advantageous to provide a subregion of the inner side of the running gear with an inner profiling. However, the advantages brought about thereby can be utilized more comprehensively if this inner profiling is provided to completely run around in the running direction.

Here, it can be particularly advantageous to provide the inner profiling to be formed in one piece with an elastomer material of the flexible body, because the inner profiling can then already be concomitantly formed during the formation and vulcanization of the elastomer body, and therefore additional production and assembly steps can be dispensed with. In particular, the formation of the inner profiling in one piece with the elastomer body can ensure a stable connection between the inner profiling and the elastomer body.

According to a further aspect of the present invention, at least one rigid transverse element, preferably all of the rigid transverse elements, consists/consist of metal, preferably of aluminum or steel, and/or at least one rigid transverse element, preferably all of the rigid transverse elements, contains/contain a metal, preferably aluminum or steel, or a glass-fiber-reinforced plastic which is embedded at least partially, preferably completely, into an elastomer material. If a rigid transverse element is formed from metal, it can be produced in a comparatively simple manner, for example by forming or primary forming. A very stable and robust rigid transverse element which can engage strongly in the ground can also be created. Here, aluminum has a lower weight but is more expensive than steel. If a rigid transverse element is formed from metal surrounded by elastomer material, a high degree of stability of the rigid transverse element can also be achieved. At the same time, however, corrosion of the metal can be prevented by the sheathing. Furthermore, an elastic contact with the ground can be achieved, thus for example making it possible to protect a concreted road or the like. Here, only rigid transverse elements of one above-described type can be used in a running gear chain or both above-described types can be used in combination with one another. As a result, the respective properties and advantages can be used or combined depending on the application.

According to a further aspect of the present invention, at least one rigid transverse element, preferably all of the rigid transverse elements, has/have an outwardly pointing receptacle which is designed to receive a profiled element and to hold it in a force-fitting manner and/or form-fitting manner. In this way, the rigid transverse elements can be used for the areal stiffening of the running gear chain and be combined with additional profiled elements in order, for example, to increase the adhesion on the ground or else in order to achieve an elastic adhesion on the ground. Providing these profiled elements to be replaceable has the advantage, firstly, that the profiled elements can be varied in a flexible manner depending on the application. Secondly, damaged or worn profiled elements can be replaced. Here, the profiled elements can be fastened for example by fastening means, such as, for example, by screws. Alternatively, however, a profiled element can also be clamped into the receptacle of the rigid transverse element and be held solely in a force-fitting manner by clamping. This can simplify and accelerate the fitting and the replacement.

According to a further aspect of the present invention, at least one rigid transverse element, preferably all of the rigid transverse elements, has/have a profiled element, wherein the profiled element is formed either elastically, preferably from an elastomer material, or rigidly, preferably from metal, particularly preferably from steel or aluminum, or from glass-fiber-reinforced plastic. As a result, some of the advantages already described above can be achieved.

An exemplary embodiment and further advantages of the invention will be discussed below in conjunction with the following figures, in which.

The description of the aforementioned figures is given in Cartesian coordinates with a longitudinal direction X, a transverse direction Y, which is oriented perpendicularly to the longitudinal direction X and which may also be referred to as the width Y, and a vertical direction Z, which is oriented perpendicularly both to the longitudinal direction X and to the transverse direction Y and which may also be referred to as the height Z.

Figure 1:
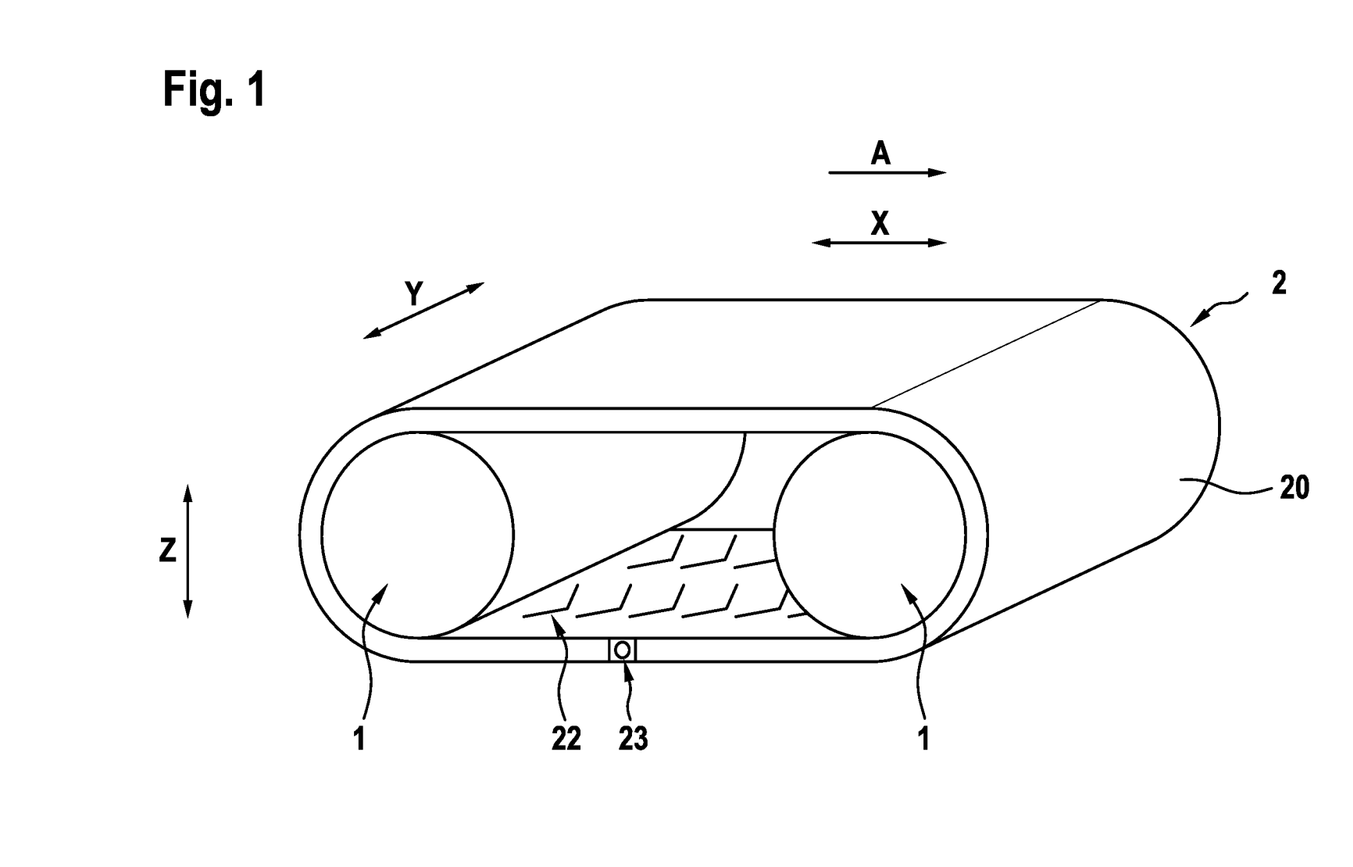
FIG. 1 shows a perspective schematic illustration of a running gear chain according to the invention without rigid transverse elements.

A running gear chain 2 according to the invention may also be referred to as a running gear belt 2 and is preferably formed as a bogie chain 2 or as a bogie belt 2 in order to be used around the rubber tires 1 of running gear a forestry vehicle. The bogie chain 2 is closable in endless fashion in the circumferential direction or in a running direction A of the vehicle. The bogie chain 2 has a flexible body 20 which consists of an elastomer material into which a multiplicity of tension members 21 in the form of steel cables 21 are embedded.

The steel cables 21 extend parallel to one another in the running direction A and are uniformly spaced apart from one another in the transverse direction Y. The steel cables 21 and the elastomer body 20 end together at both ends in a respective end element via which the bogie chain 2 can be closed in endless fashion. Here, the two end elements (not shown) together form a connecting element 23, which may also be referred to as a lock 23.

On its inner side, which faces the rubber tires 1, the elastomer body 20 has an inner profiling 22 which is formed in one piece with the elastomer body 20 as elevations from the same elastomer material. In this exemplary embodiment, the inner profiling 22 is formed in two rows extending parallel to one another from angle profiles, as are customary, for example, in conveyor belts in order to better hold the conveyed material in gradients. Alternatively, inner profilings 22 as are customary in rubber tires as profiles would also be possible. In each case, the adhesion between the outer surfaces of the rubber tires 1 and the inner side of the bogie chain 2 can be improved as a result.

Figure 2:
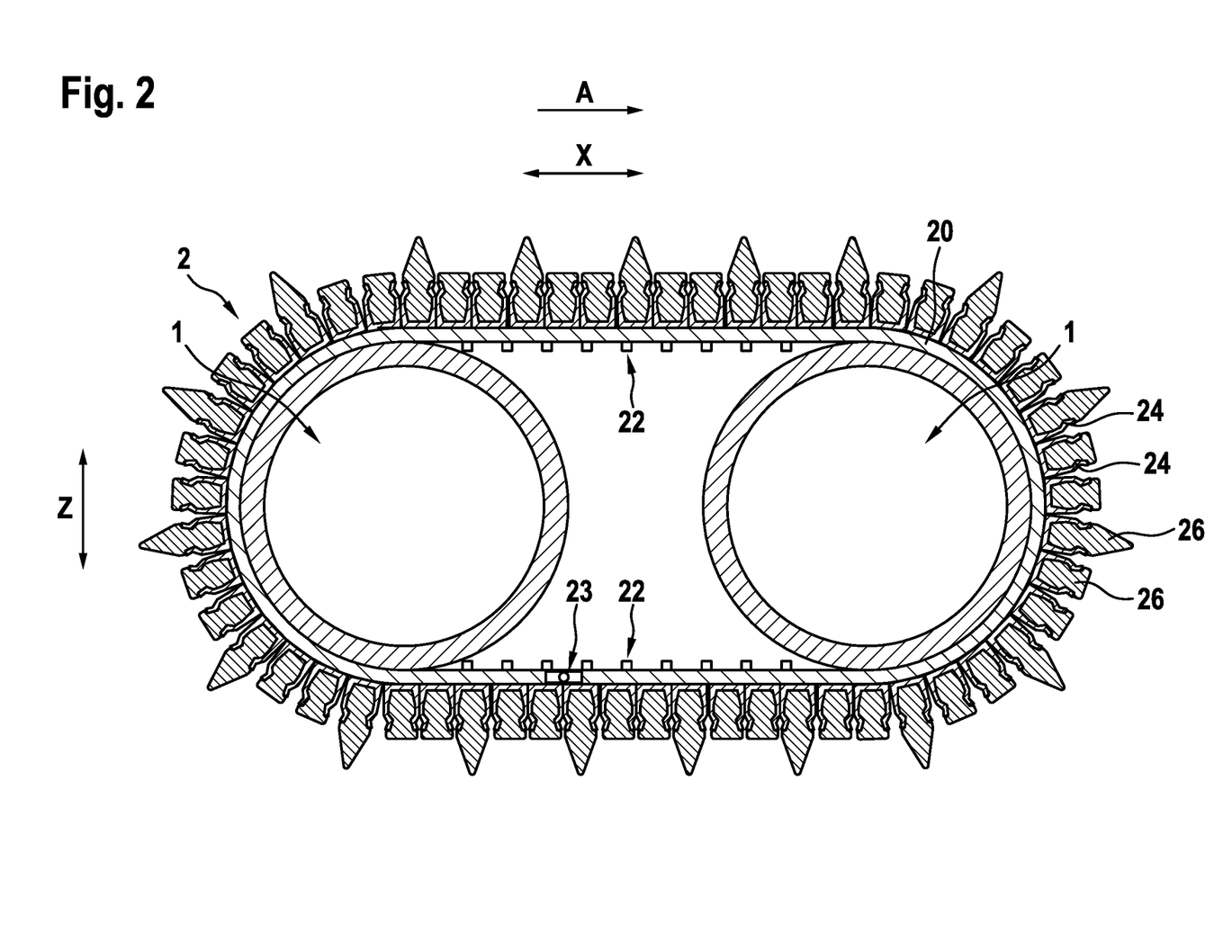
FIG. 2 shows the illustration of FIG. 1 in cross section with rigid transverse elements.
Figure 3:
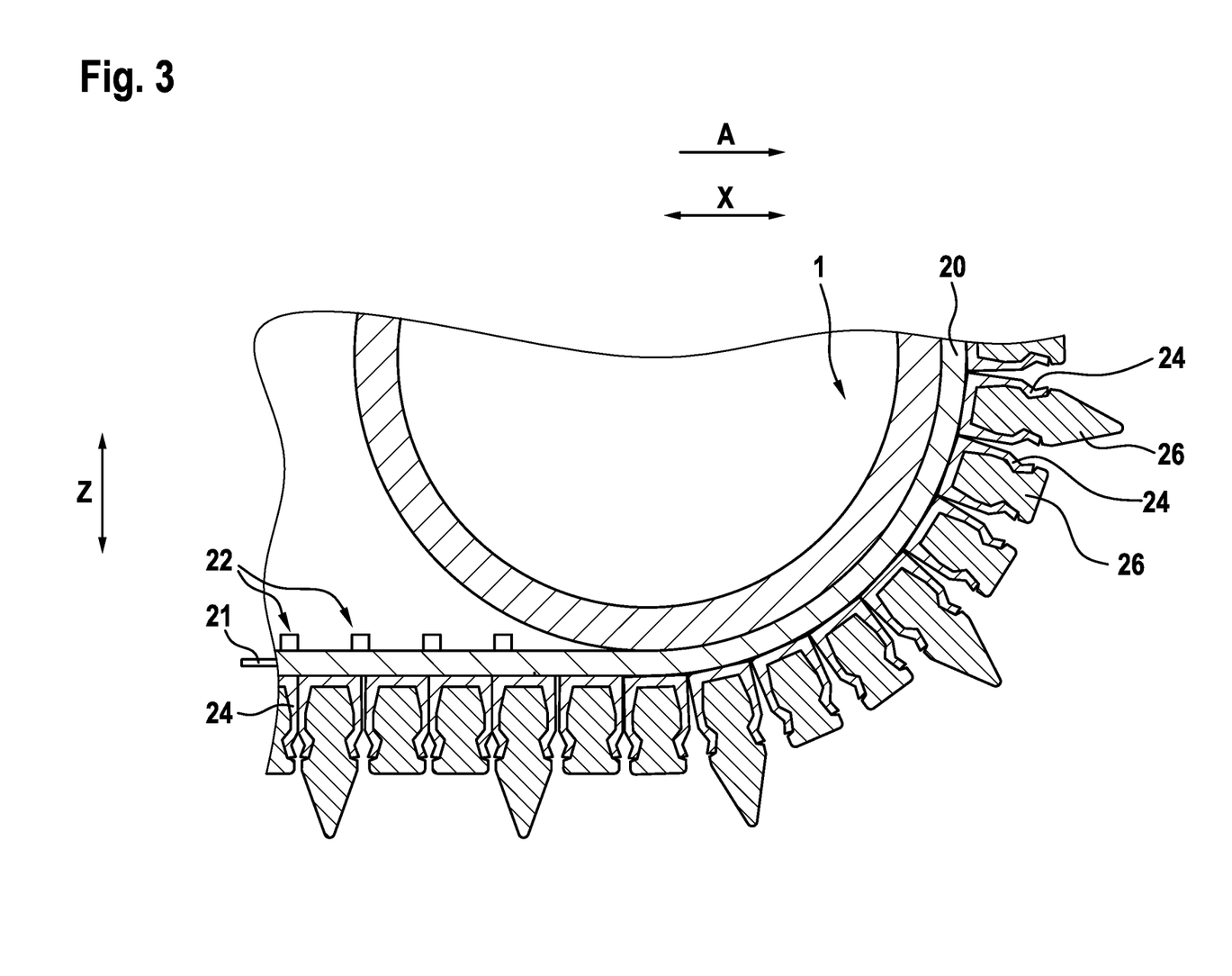
FIG. 3 shows a detail of FIG. 2.

On its outer side, which faces away from the rubber tires 1, the elastomer body 20 has rigid transverse elements 24 which each extend in the transverse direction Y and are placed close to one another in the running direction A. The rigid transverse elements 24 are each vulcanized by way of their lower side on the outer side of the elastomer body 20. The rigid transverse elements 24 are each designed as a U-shaped steel profile and are arranged so tightly fitting on the outer side of the elastomer body 20 that the adjacent rigid transverse elements 24 then contact one another and are supported against one another when this region of the bogie chain 2 lies horizontally on a ground. As a result, the formation of a stiff surface in the running direction A can be achieved, with the result that a flexing of the bogie chain 2 can be considerably reduced or even completely prevented and thus the effective contact area can be increased.

Figure 4:
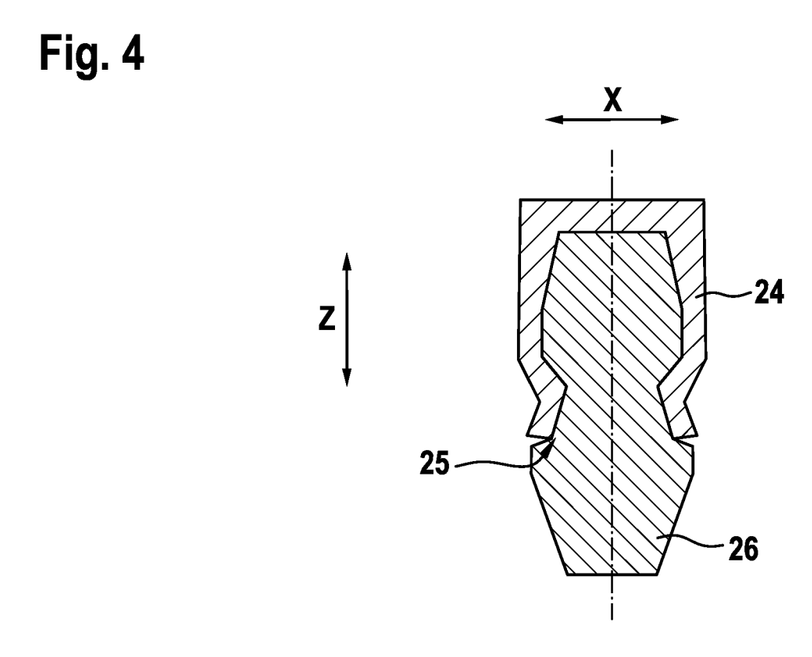
FIG. 4 shows a cross section through a rigid transverse element.

The U-shaped form of the rigid transverse elements 24 results in the respective creation of a receptacle 25 which extends in the transverse direction Y and is designed to narrow resiliently in the outward direction. It is possible in this way for in each case a profiled element 26 to be inserted laterally into the receptacle 25 of a rigid transverse element 24 and held in a force-fitting manner by the spring force of the narrowing. In this way, the contact with the ground can be influenced and, depending on the application, adjusted. For example, for travel on a concreted road, use can be made of elastomer profiled elements 26 in order to protect the ground. For off-road use, it is alternatively possible to use profiled elements 26 made of steel or the like in order to increase the adhesion on the ground or the engagement in the ground. Different profiled elements 26 can also be combined with one another.

The profiled element (26) is either formed elastically, preferably from an elastomer material, or rigidly, preferably from metal, particularly preferably from steel or aluminum, or from glass-fiber-reinforced plastic.

LIST OF REFERENCE SIGNS (PART OF THE DESCRIPTION)

A Running direction or movement direction of the vehicle
X Longitudinal direction
Y Transverse direction; width
Z Vertical direction; height
1 Wheels of running gear of a vehicle; rubber tires; pneumatic rubber tires
2 Running gear chain; running gear belt; bogie chain; bogie belt
20 Flexible body; elastomer body
21 Tension member; steel cables; aramid cables; sheetlike structure; woven fabric insert
22 Inner profiling
23 Connecting element; lock
24 Rigid transverse elements; transverse stiffening elements; transverse struts
25 Receptacle of a transverse element 24
26 Elastomer profiled elements

The invention claimed is:

1. A running gear bogie chain, comprising:
a flexible elastomer body, which is closed in an endless fashion and in a running direction;
a multiplicity of rigid transverse elements connected to an outer side of the flexible elastomer body and which extend substantially transversely with respect to a running direction and are arranged together in the running direction
the multiplicity of rigid transverse elements comprise a multiplicity of receptacles, wherein the multiplicity of receptacles are outwardly pointing;
the multiplicity of rigid transverse elements are connected to the outer side of the flexible elastomer body by vulcanization;
the rigid transverse elements designed as a U-shaped steel profile;
one or more profiled elements inserted into one or more of the multiplicity of receptacles; and
the multiplicity of rigid transverse elements are arranged close together in the running direction (A) that two immediately adjacent rigid transverse elements make contact in the running direction (A).

2. The running gear bogie chain as claimed in claim 1, wherein the multiplicity of rigid transverse elements are connected to the outer side of the flexible elastomer body so as to be rowed up in the running direction without intervals.

3. The running gear bogie chain as claimed in claim 1, wherein the individual rigid transverse elements are each designed to be short in the running direction such that the running gear chain is bendable around a running gear of a vehicle.

4. The running gear bogie chain as claimed in claim 1, wherein the flexible elastomer body has a multiplicity of tension members that extend in the running direction and are embedded into the flexible elastomer body.

5. The running gear bogie chain as claimed in claim 4, wherein the multiplicity of tension members comprise a cable, wherein the cable is selected from a group comprising a steel cable, a glass fiber cable and/or an aramid cable.

6. The running gear bogie chain as claimed in claim 1, wherein an individual tension member of the multiplicity of tension members is formed over the entire width of the running gear chain or only over part of the width of the running gear chain, wherein at least one edge region in the transverse direction is/are formed free of the multiplicity of tension members.

7. The running gear bogie chain as claimed in claim 1, wherein the flexible elastomer body has an inner profiling on its inner side at least partially in the transverse direction and/or in the running direction, wherein the inner profiling is formed in one piece with an elastomer material of the flexible elastomer body.

8. The running gear bogie chain as claimed in claim 1, wherein at least one rigid transverse element comprises a material selected from the group consisting of aluminum, steel, and a glass-fiber-reinforced plastic.

9. The running gear bogie chain as claimed in claim 1, wherein the multiplicity of receptacles are designed to receive a multiplicity of profiled elements.

10. The running gear bogie chain as claimed in claim 9, wherein a longer profiled element of the multiplicity of profiled elements has a longer profile than adjacent profiled elements of the multiplicity of profiled elements.

11. The running gear bogie chain as claimed in claim 9, wherein only a portion of the multiplicity of receptacles include the multiplicity of profiled elements.

12. The running gear bogie chain as claimed in claim 9, wherein a first portion of the multiplicity of profiled elements are made of steel and a second portion of the multiplicity of profiled elements are made of an elastomer material.

13. The running gear bogie chain as claimed in claim 9, wherein the multiplicity of profiled elements are made of glass-fiber-reinforced plastic.

14. The running gear bogie chain as claimed in claim 1, the one or more profiled elements comprising elastomer to protect ground for travel on a concreted road.

15. The running gear bogie chain as claimed in claim 1, the one or more profiled elements comprising steel to increase adhesion to the ground for off-road use.

16. The running gear bogie chain as claimed in claim 1, the one or more profiled elements comprising elastomer profiled elements and profiled elements made of steel.

* * * * *